(12) United States Patent
Chatterji et al.

(10) Patent No.: US 6,593,402 B2
(45) Date of Patent: Jul. 15, 2003

(54) RESILIENT WELL CEMENT COMPOSITIONS AND METHODS

(75) Inventors: Jiten Chatterji, Duncan, OK (US); Roger S. Cromwell, Walters, OK (US); Baireddy R. Reddy, Edmond, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 157 days.

(21) Appl. No.: 09/778,138

(22) Filed: Feb. 6, 2001

(65) Prior Publication Data

US 2002/0033263 A1 Mar. 21, 2002

Related U.S. Application Data

(62) Division of application No. 09/255,301, filed on Feb. 22, 1999, now Pat. No. 6,234,251.

(51) Int. Cl.[7] .............................. C08K 3/00; E21B 29/10
(52) U.S. Cl. .............................. 524/7; 524/8; 523/130; 523/401; 166/293; 166/294; 166/295
(58) Field of Search .............................. 166/293, 294, 166/295; 523/401, 130; 524/7, 8

(56) References Cited

U.S. PATENT DOCUMENTS

| | | | |
|---|---|---|---|
| 2,815,079 A | 12/1957 | Goins, Jr. et al. | 166/29 |
| 3,082,823 A | 3/1963 | Hower | 166/29 |
| 3,208,525 A | 9/1965 | Caldwell et al. | 166/33 |
| 3,308,884 A | 3/1967 | Robichaux | 166/33 |
| 3,310,111 A | 3/1967 | Pavlich et al. | 166/33 |
| 3,310,511 A | 3/1967 | Reinert | 260/29.2 |
| 3,416,604 A | 12/1968 | Rensvold | 166/33 |
| 3,467,208 A | 9/1969 | Kelly, Jr. | 175/75 |
| 3,612,181 A | 10/1971 | Brooks, Jr. | 166/295 |
| 3,705,116 A | 12/1972 | Vargin et al. | 260/2.5 |
| 3,750,768 A | 8/1973 | Suman, Jr. et al. | 175/72 |
| 3,763,070 A | 10/1973 | Shearing | 260/29.2 |
| 3,769,250 A | 10/1973 | Nikles, Jr. | 260/29.2 |
| 3,782,466 A | 1/1974 | Lawson et al. | 166/254 |
| 3,894,977 A | 7/1975 | Brown et al. | 260/18 EP |
| 3,933,204 A | 1/1976 | Knapp | 166/295 |
| 3,960,801 A | 6/1976 | Cole et al. | 260/33.6 EP |
| 3,976,135 A | 8/1976 | Anderson | 166/276 |
| 4,042,031 A | 8/1977 | Knapp | 166/276 |
| 4,042,032 A | 8/1977 | Anderson et al. | 166/276 |
| 4,072,194 A | 2/1978 | Cole et al. | 166/295 |
| 4,101,474 A | 7/1978 | Copeland et al. | 260/13 |
| 4,107,112 A | 8/1978 | Latta, Jr. et al. | 260/18 EP |
| 4,113,015 A | 9/1978 | Meijs | 166/295 |
| 4,127,173 A | 11/1978 | Watkins et al. | 166/276 |
| 4,189,002 A | 2/1980 | Martin | 166/295 |
| 4,199,484 A | 4/1980 | Murphey | 260/13 |
| 4,215,001 A | 7/1980 | Elphingstone et al. | 252/8.55 C |
| 4,216,829 A | 8/1980 | Murphey | 166/276 |
| 4,220,566 A | 9/1980 | Constien et al. | 260/13 |
| 4,272,384 A | 6/1981 | Martin | 252/8.55 R |

(List continued on next page.)

FOREIGN PATENT DOCUMENTS

| | | | |
|---|---|---|---|
| EP | 0 553 566 A1 | 12/1992 | E21B/43/04 |
| EP | 522931 | 1/1993 | |
| EP | 786439 | 7/1997 | |
| EP | 0 802 253 A1 | 10/1997 | C09K/7/02 |
| FR | 1315462 | 12/1962 | |
| FR | 0 91 377 A1 | 4/1983 | C04B/13/24 |
| GB | 1019122 | 2/1966 | E02D/3/14 |
| JP | 05032444 | 2/1993 | |
| WO | WO 91/02703 | 3/1991 | C04B/24/24 |
| WO | WO 94/12445 | 6/1994 | C04B/26/18 |

OTHER PUBLICATIONS

Abstract No. XP002146282 dated Oct. 15, 1982; Derwent Publications, Ltd.
Abstract No. XP002146283 dated Oct. 12, 1977; Derwent Publications, Ltd.
Abstract No. XP002145741 dated Mar. 12, 1996; Derwent Publications, Ltd.
Abstract No. XP002145742 dated Apr. 15, 1993; Derwent Publications, Ltd.
Paper entitled "Conditioning of Spent Ion Exchange Resins By Embedding In Compound Matrixes", by C.J. Kertesz; Waste Management, Tucson, AZ, 1991, vol. 2, pp. 381–6.
Abstract No. 78:137411 entitled "Hardenable Resin Compositions" by Hiroshi Komoto.
Abstract No. 93:119277 entitled "Binder Mixture For Mortar" by Karl Hermann Conrad et al.
Abstract No. 102:208395 entitled "Chemical Admixtures For Cement".
Abstract No. 104:38839 entitled "Use of An Aqueous Epoxy Resin Emulsion In Preparing Aerated Concrete" by Hermann Volland et al.
Abstract No. 124:64550 entitled "Hydraulic Composition for High–Strength Polymer Concrete" by Tadao Sakurai.
Abstract No. 125:283143 entitled "Rapid Hardening Cement—Epoxy Resin Compositions wih Segregation Prevention" by Jinichi Omi.
Abstract No. 129:179103 entitled "High–Strength Cement Hardened Bodies With Water Resistance And Its Manufacturing Method" By Yoshihiko Oohama.
Abstract No. 131:215399 entitled "Biodegradable Polymer Moldings With Good Water Resistance" by Masashi Achinami et al.
Abstract No. 133:21349 entitled "Mixes for Macroporous Concrete" By Marin Stanclescu.

*Primary Examiner*—Peter D. Mulcahy
(74) *Attorney, Agent, or Firm*—Craig W. Roddy; C. Clark Dougherty, Jr.

(57) ABSTRACT

The present invention provides improved compositions and methods for sealing pipe in a well bore. The compositions which harden into highly resilient solid masses having high strengths are basically comprised of a hydraulic cement, an aqueous rubber latex, an aqueous rubber latex stabilizing surfactant and silica hydrophobicized with silicon oil.

16 Claims, No Drawings

U.S. PATENT DOCUMENTS

| | | | |
|---|---|---|---|
| 4,336,842 A | 6/1982 | Graham et al. | 166/276 |
| 4,339,000 A | 7/1982 | Cronmiller | 166/295 |
| 4,367,300 A | 1/1983 | Aoki et al. | 524/2 |
| 4,368,136 A | 1/1983 | Murphey | 252/316 |
| 4,477,626 A | 10/1984 | Suzuki | 524/862 |
| 4,483,888 A | 11/1984 | Wu | 427/336 |
| 4,489,785 A | 12/1984 | Cole | 166/295 |
| 4,532,052 A | 7/1985 | Weaver et al. | 252/8.55 R |
| 4,537,918 A | 8/1985 | Parcevaux et al. | 523/130 |
| 4,558,075 A | 12/1985 | Suss et al. | 523/216 |
| 4,569,971 A | 2/1986 | Sasse et al. | 525/109 |
| 4,620,993 A | 11/1986 | Suss et al. | 427/407.1 |
| 4,665,988 A | 5/1987 | Murphey et al. | 166/295 |
| 4,718,492 A | 1/1988 | Van Laar | 166/295 |
| 4,741,401 A | 5/1988 | Walles et al. | 166/300 |
| 4,767,460 A | 8/1988 | Parcevaux et al. | 106/90 |
| 4,773,482 A | 9/1988 | Allison | 166/270 |
| 4,785,884 A | 11/1988 | Armbruster | 166/280 |
| 4,829,100 A | 5/1989 | Murphey et al. | 523/131 |
| 4,921,047 A | 5/1990 | Summers et al. | 166/276 |
| 4,972,906 A | 11/1990 | McDaniel | 166/276 |
| 5,090,478 A | 2/1992 | Summers | 166/278 |
| 5,095,987 A | 3/1992 | Weaver et al. | 166/276 |
| 5,107,928 A | 4/1992 | Hilterhaus | 166/293 |
| 5,133,409 A | 7/1992 | Bour et al. | 166/293 |
| 5,159,980 A | 11/1992 | Onan et al. | 166/294 |
| 5,162,060 A | 11/1992 | Bredow et al. | 166/808 |
| 5,168,928 A | 12/1992 | Terry et al. | 166/292 |
| 5,211,234 A | 5/1993 | Floyd | 166/276 |
| 5,213,161 A | 5/1993 | King et al. | 166/293 |
| 5,232,741 A | 8/1993 | Wu | 427/386 |
| 5,232,961 A | 8/1993 | Murphey et al. | 523/414 |
| 5,258,072 A | 11/1993 | Gopalkirshnan et al. | 106/802 |
| 5,293,938 A | 3/1994 | Onan et al. | 166/293 |
| 5,314,023 A | 5/1994 | Dartez et al. | 166/295 |
| 5,335,726 A | 8/1994 | Rodrigues | 166/295 |
| 5,337,824 A | 8/1994 | Cowan | 166/293 |
| 5,358,044 A | 10/1994 | Hale et al. | 166/293 |
| 5,358,051 A | 10/1994 | Rodrigues | 166/295 |
| 5,361,841 A | 11/1994 | Hale et al. | 166/293 |
| 5,361,842 A | 11/1994 | Hale et al. | 166/293 |
| 5,363,918 A | 11/1994 | Cowan et al. | 166/295 |
| 5,368,102 A | 11/1994 | Dewprashad et al. | 166/276 |
| 5,373,901 A | 12/1994 | Norman et al. | 166/300 |
| 5,377,757 A | 1/1995 | Ng | 166/277 |
| 5,388,648 A | 2/1995 | Jordan, Jr. | 166/380 |
| 5,428,178 A | 6/1995 | Zuzich et al. | 549/378 |
| 5,458,195 A | 10/1995 | Totten et al. | 166/293 |
| 5,547,027 A | 8/1996 | Chan et al. | 166/295 |
| 5,559,086 A | 9/1996 | Dewprashad et al. | 507/219 |
| 5,588,488 A | 12/1996 | Vijn et al. | 166/293 |
| 5,609,207 A | 3/1997 | Dewprashad et al. | 166/276 |
| 5,688,844 A | 11/1997 | Chatterji et al. | 524/8 |
| 5,692,566 A | 12/1997 | Surles | 166/295 |
| 5,712,314 A | 1/1998 | Surles et al. | 521/41 |
| 5,738,463 A | 4/1998 | Onan | 405/154 |
| 5,795,924 A | 8/1998 | Chatterji et al. | 523/130 |
| 5,820,670 A | 10/1998 | Chatterji et al. | 106/727 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,911,282 A | 6/1999 | Onan et al. | 175/72 |
| 5,913,364 A | 6/1999 | Sweatman | 166/281 |
| 5,957,204 A | 9/1999 | Chatterji et al. | 166/295 |
| 5,969,006 A | 10/1999 | Onan et al. | 523/166 |
| 6,006,835 A | 12/1999 | Onan et al. | 166/295 |
| 6,006,836 A | 12/1999 | Chatterji et al. | 166/295 |
| 6,059,035 A | 5/2000 | Chatterji et al. | 166/293 |
| 6,098,711 A | 8/2000 | Chatterji et al. | 166/294 |
| 6,124,246 A | 9/2000 | Heathman et al. | 507/219 |
| 6,156,808 A * | 12/2000 | Chatterji et al. | 516/116 |
| 6,231,664 B1 | 5/2001 | Chatterji et al. | 106/724 |
| 6,234,251 B1 | 5/2001 | Chatterji et al. | 166/295 |
| 6,244,344 B1 | 6/2001 | Chatterji et al. | 166/295 |
| 6,258,757 B1 | 7/2001 | Sweatman et al. | 507/219 |
| 6,271,181 B1 | 8/2001 | Chatterji et al. | 507/219 |
| 6,279,652 B1 | 8/2001 | Chatterji et al. | 166/194 |
| 6,350,309 B2 | 2/2002 | Chatterji et al. | 106/677 |
| 6,367,549 B1 | 4/2002 | Chatterji et al. | 166/292 |
| 6,401,817 B1 | 6/2002 | Griffith et al. | 166/295 |
| 6,448,206 B1 | 9/2002 | Griffith et al. | 507/219 |

* cited by examiner

RESILIENT WELL CEMENT COMPOSITIONS AND METHODS

RELATED U.S. APPLICATION DATA

This is a divisional of application Ser. No. 09/255,301 filed on Feb. 22, 1999, now U.S. Pat. No. 6,234,251.

BACK GROUND OF THE INVENTION

1. Field of the Invention

The present invention relates generally to cementing subterranean wells, and more particularly, to cement compositions which set into resilient solid masses having high strength.

2. Description of the Prior Art

Hydraulic cement compositions are commonly utilized in primary cementing operations whereby pipe strings such as casings and liners are cemented in well bores. In performing primary cementing, a hydraulic cement composition is pumped into the annular space between the walls of the well bore and the exterior surfaces of the pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented.

The development of wells including one or more laterals to increase production has recently taken place. Such multi-lateral wells include vertical or deviated (including horizontal) principal well bores having one or more ancillary laterally extending well bores connected thereto. Drilling and completion equipment has been developed which allows multi-laterals to be drilled from a principal cased and cemented well bore. Each of the lateral well bores can include a liner cemented therein which is tied into the principal well bore. The lateral well bores can be vertical or deviated and can be drilled into predetermined producing formations or zones at any time in the productive life cycle of the well.

In both conventional single bore wells and multi-lateral wells having several bores, the cement composition utilized for cementing casing or liners in the well bores must develop high strength after setting and also have sufficient resiliency, i.e., elasticity and ductility, to resist the loss of the bonds between the pipe and formation and the cement composition. Also, the cement composition must be able to resist cracking and/or shattering as a result of pipe movements, impacts and shocks subsequently generated by drilling and other well operations. The bond loss, cracking or shattering of the set cement allows leakage of formation fluids through at least portions of the well bore or bores which can be highly detrimental.

The cement sheath in the annulus between a pipe string and the walls of a well bore often fail due to pipe movements which cause shear and compressional stresses to be exerted on the set cement. Such stress conditions are commonly the result of relatively high fluid pressures and/or temperatures inside the cemented pipe string during testing, perforating, fluid injection or fluid production. The high internal pipe pressure and/or temperature results in the expansion of the pipe string, both radially and longitudinally, which places stresses on the cement sheath causing it to crack or causing the cement bonds between the exterior surfaces of the pipe or the well bore walls, or both, to fail which allows leakage of formation fluids, etc.

Stress conditions also result from exceedingly high pressures which occur inside the cement sheath due to the thermal expansion of fluids trapped within the cement sheath. This condition often occurs as a result of high temperature differentials created during the injection or production of high temperature fluids through the well bore, e.g., wells subjected to steam recovery or the production of hot formation fluids from high temperature formations. Typically, the pressure of the trapped fluids exceeds the collapse pressure of the cement and pipe causing leaks and bond failure. Other compressional stress conditions occur as a result of outside forces exerted on the cement sheath due to formation shifting, overburden pressures, subsidence and/or tectonic creep.

Thus, there are needs for improved well cement compositions and methods whereby after setting, the cement compositions form highly resilient solid masses which have high compressive, tensile and bond strengths sufficient to withstand the above described stresses without failure.

SUMMARY OF THE INVENTION

The present invention provides improved cement compositions and methods for sealing pipe in well bores which meet the needs described above and overcome the deficiencies of the prior art. The improved compositions of the invention are basically comprised of a hydraulic cement, an aqueous rubber latex present in an amount in the range of from about 40% to about 55% by weight of hydraulic cement in the composition, an effective amount of an aqueous rubber latex stabilizing surfactant, and silica hydrophobicized with silicon oil present in an amount in the range of from about 0.5% to about 2% by weight of the composition.

The improved methods of this invention for cementing pipe in a well bore are comprised of the following steps. A cement composition of the invention is prepared which hardens into a highly resilient solid mass having high compressive, tensile and bond strengths. The cement composition is placed in the annulus between the pipe and the walls of the well bore and then allowed to harden therein.

It is, therefore, a general object of the present invention to provide improved cement compositions which harden into resilient solid masses having high strength and methods of using such cement compositions for sealing pipe in well bores.

Other and further objects, features and advantages of the present invention will be readily apparent to those skilled in the art upon a reading of the description of preferred embodiments which follows.

DESCRIPTION OF THE PREFERRED EMBODIMENTS

As mentioned, the present invention provides improved compositions and methods for cementing pipe in well bores whereby the hardened cement composition is a highly resilient solid mass having high compressive, tensile and bond strengths and which effectively withstands pipe movements due to expansion, contraction, impacts, shocks or the like. The compositions of this invention are basically comprised of a hydraulic cement, an aqueous rubber latex, an aqueous rubber latex stabilizing surfactant and silica which has been hydrophobicized with silicon oil.

A more preferred composition of this invention is comprised of a hydraulic cement, an aqueous rubber latex, an aqueous rubber latex-stabilizing surfactant, an epoxy resin, an epoxy resin hardening agent and porous precipitated silica which has been hydrophobicized with silicon oil.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high aluminum content cements, silica cements and high alkalinity cements. Portland cements or their equivalence are generally preferred for use in accordance with the present invention. Portland cements of the types defined and described in *API Specification For Materials And Testing For Well Cements,* API Specification 10, 5th Edition, dated Jul. 1, 1990 of the American Petroleum Institute are particularly suitable. Preferred API Portland cements include classes A, B, C, G and H, with API classes G and H being more preferred and class G being the most preferred.

A variety of well known rubber materials which are commercially available in aqueous latex form, i.e., aqueous dispersions or emulsions, can be utilized in accordance with the present invention. For example, natural rubber (cis-1,4-polyisoprene) and most of its modified types can be utilized. Synthetic polymers of various types can also be used including nitrile rubber, ethylene-propylene rubbers (EPM and EPDM), styrene-butadiene rubber (SBR), nitrile-butadiene rubber (NBR), butyl rubber, neoprene rubber, cis-1,4-polybutadiene rubber and blends thereof with natural rubber or styrene-butadiene rubber, high styrene resin, silicone rubber, chlorosulfonated polyethylene rubber, crosslinked polyethylene rubber, epichlorohydrin rubber, fluorocarbon rubber, fluorosilicone rubber, polyurethane rubber, polyacrylic rubber and polysulfide rubber. The aqueous latex forms of one or more of the above rubbers can be utilized with the other components of the sealing composition being added directly to the latex.

Of the various aqueous rubber latexes which can be utilized, those formed of cis-polyisoprene rubber, nitrile rubber, ethylene-propylene rubber, styrene-butadiene rubber, nitrile-butadiene rubber, butyl rubber and neoprene rubber are generally preferred.

The most preferred aqueous rubber latex for use in accordance with this invention is a styrene-butadiene copolymer latex emulsion prepared by emulsion polymerization. The aqueous phase of the emulsion is an aqueous colloidal dispersion of the styrene-butadiene copolymer. The latex dispersion usually includes water in an amount in the range of from about 40% to about 70% by weight of the latex, and in addition to the dispersed styrene-butadiene particles, the latex often includes small quantities of an emulsifier, polymerization catalysts, chain modifying agents and the like. The weight ratio of styrene to butadiene in the latex can range from about 10%:90% to about 90%:10%.

Styrene-butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable and preferred styrene-butadiene aqueous latex contains water in an amount of about 50% by weight of the latex, and the weight ratio of styrene to butadiene in the latex is about 25%:75%. A latex of this type is available from Halliburton Energy Services of Duncan, Okla., under the trade designation "LATEX 2000™."

The aqueous rubber latex utilized is generally included in the cement compositions of this invention in an amount in the range of from about 40% to about 55% by weight of hydraulic cement in the compositions.

In order to prevent the aqueous latex from prematurely coagulating and increasing the viscosity of the sealing compositions, an effective amount of a rubber latex stabilizing surfactant can be included in the compositions. A suitable such surfactant has the formula

$R—Ph—O(OCH_2CH_2)_mOH$ wherein R is an alkyl group having from about 5 to about 30 carbon atoms, Ph is phenyl and m is an integer in the range of from about 5 to about 50. A preferred surfactant in this group is ethoxylated nonylphenol containing in the range of from about 20 to about 30 moles of ethylene oxide.

Another latex stabilizing surfactant which can be used has the general formula

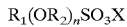
$R_1(OR_2)_nSO_3X$ wherein $R_1$ is selected from the group consisting of alkyl groups having from 1 to about 30 carbon atoms, cycloalkyl groups having 5 or 6 carbon atoms, $C_1–C_4$ alkyl substituted cycloalkyl groups, phenyl, alkyl substituted phenol of the general formula

$(R_3)_aPh—$ wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms; $R_2$ is a substituted ethylene group of the formula

$—CH_2CH_2R_4$ wherein $R_4$ is selected from hydrogen, methyl, ethyl or mixtures thereof; n is a number from 0 to about 40 provided that when $R_1$ is phenyl or alkyl substituted phenyl, n is at least 1; and X is any compatible cation.

Another latex stabilizing surfactant which can be utilized is a sodium salt having the general formula

$R_5—Ph(OR_6)_oSO_3X$ wherein $R_5$ is an alkyl radical having in the range of from 1 to about 9 carbon atoms, $R_6$ is the group $—CH_2CH_2—$, o is an integer from about 10 to about 20 and X is a compatible cation.

Another surfactant which can be utilized is a sodium salt having the formula

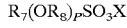
$R_7(OR_8)_PSO_3X$ wherein $R_7$ is an alkyl group having in the range of from about 5 to about 20 carbon atoms, $R_8$ is the group $—CH_2CH_2—$, p is an integer in the range of from about 10 to about 40 and X is a compatible cation. A preferred surfactant of this type is the sodium salt of a sulfonated compound derived by reacting a $C_2–C_{15}$ alcohol with about 40 moles of ethylene oxide (hereinafter referred to as an "ethoxylated alcohol sulfonate") which is commercially available under the name "AVANEL S400™" from PPG Mazer, a division of PPG Industries, Inc. of Gurnee, Ill.

While different rubber latex stabilizers and amounts can be included in the cement compositions of this invention depending on the particular aqueous rubber latex used and other factors, the latex stabilizer is usually included in the cement compositions in an amount in the range of from about 10% to about 20% by weight of the aqueous rubber latex in the compositions.

A variety of hardenable epoxy resins can be utilized in the cement compositions of this invention. Preferred epoxy resins are those selected from the condensation products of epichlorohydrin and bisphenol A. A particularly suitable such resin is commercially available from the Shell Chemical Company under the trade designation "EPON®RESIN 828." This epoxy resin has a molecular weight of about 340 and a one gram equivalent of epoxide per about 180 to about 195 grams of resin. Another suitable epoxy resin is an epoxidized bisphenol A novolac resin which has a one gram equivalent of epoxide per about 205 grams of resin.

For ease of mixing, the epoxy resin utilized is preferably pre-dispersed in a non-ionic aqueous fluid. A non-ionic aqueous dispersion of the above described condensation product of epichlorohydrin and bisphenol A is commercially available from the Shell Chemical Company under the trade designation "EPI-REZ®-3510-W-60." Another non-ionic aqueous dispersion of an epoxy resin comprised of a condensation product of epichlorohydrin and bisphenol A having a higher molecular weight than the above described resin is also commercially available from the Shell Chemical Company under the trade designation "EPI-REZ®-3522-W-60." The above mentioned epoxidized bisphenol A novolac resin is commercially available in a non-ionic aqueous dispersion from the Shell Chemical Company under the trade designation "EPI-REZ®-5003-W-55." Of the foregoing non-ionic aqueous dispersions of epoxy resins, the aqueous dispersion of the condensation product of epichlorohydrin and bisphenol A having a molecular weight of about 340 and a one gram equivalent of epoxide per about 180 to about 195 grams of resin is the most preferred.

The epoxy resin utilized is preferably included in the cement compositions of this invention in an amount in the range of from about 5% to about 15% by weight of hydraulic cement in the compositions.

A variety of hardening agents, including, but not limited to, aliphatic amines, aliphatic tertiary amines, aromatic amines, cycloaliphatic amines, heterocyclic amines, amidoamines, polyamides, polyethyleneamines and carboxylic acid anhydrides can be utilized in the compositions of this invention containing the above described epoxy resins. Of these, aliphatic amines, aromatic amines and carboxylic acid anhydrides are the most suitable.

Examples of aliphatic and aromatic amine hardening agents are triethylenetetraamine, ethylenediamine, N-cocoalkyltri-methylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltri-methylenediamine, isophoronediamine, diethyltoluenediamine and tris(dimethylaminomethylphenol) are preferred, with isophoronediamine, diethyltoluenediamine and tris(dimethylaminomethylphenol) being the most preferred.

The hardening agent or agents utilized are preferably included in the cement compositions of this invention in an amount in the range of from about 10% to about 30% by weight of epoxy resin in the compositions (from about 1% to about 3% by weight of hydraulic cement in the compositions).

It has been discovered that the addition of particulate silica hydrophobicized with silicon oil, i.e., polydialkylsiloxanes, to the cement compositions of this invention significantly improves the strengths of the hardened cement compositions, i.e., the compressive, tensile and shear bond strengths of the compositions. The particulate silica can be hydrophobicized by spraying it with a uniform coating of silicon oil followed by heating the sprayed silica to a temperature in the range of from about 300° F. to about 570° F. for a time period in the range of from about 1 hour to about 20 hours. Suitable commercially available silicon oils which can be utilized include the silicon oil which is commercially available under the trade designation "SWS 101™" from the Dow Corning Company or the silicon oil commercially available under the trade designation "L-45™" from the Union Carbide Corporation.

While various forms of silica can be utilized, porous precipitated silica is preferred. Porous precipitated silica can be prepared by adding sulfuric acid and a sodium silicate solution to water in a reaction vessel with high agitation. The mixture of acid, sodium silicate and water must be mixed at a high rate to prevent the formation of low pH areas where gelation will occur. Since silica dissolves to form silicate at a pH value above about 9, smaller particles are continuously dissolved during the precipitation process and therefore, uniform particle sizes are obtained. As the silica precipitation progresses, the small particles aggregate through siloxane bridges to form three dimensional networks that resist the high capillary pressure that develops during drying. After drying, the precipitated porous silica is sprayed with silicon oil as described above. The hydrophobicized silica is included in the cement compositions of this invention in an amount in the range of from about 0.5% to about 2% by weight of the hydraulic cement in the compositions.

A preferred composition of the present invention is comprised of a hydraulic cement, an aqueous rubber latex present in an amount in the range of from about 40% to about 55% by weight of hydraulic cement in the composition, an effective amount of an aqueous rubber latex stabilizing surfactant, and silica hydrophobicized with silicon oil present in an amount in the range of from about 0.5% to about 2% by weight of hydraulic cement in the composition.

A more preferred composition of this invention is comprised of a hydraulic cement, preferably Portland cement or the equivalent thereof; an aqueous styrene-butadiene latex which contains water in an amount of about 50% by weight of the latex and has a weight ratio of styrene to butadiene in the latex of about 25%:75%, the latex being present in an amount in the range of from about 44% to about 53% by weight of hydraulic cement in the composition; an aqueous rubber latex stabilizing surfactant comprised of an ethoxylated alcohol sulfonate present in an amount in the range of from about 10% to about 15% by weight of the aqueous rubber latex in the composition; an epoxy resin comprised of the condensation product of epichlorohydrin and bisphenol A present in an amount in the range of from about 10% to about 12% by weight of hydraulic cement in the composition; an epoxy resin hardening agent comprised of diethyltoluenediamine present in an amount in the range of from about 10% to about 20% by weight of epoxy resin in the composition (from about 1% to about 2% by weight of hydraulic cement in the composition); and porous precipitated silica hydrophobicized with silicon oil present in an amount in the range of from about 0.5% to about 1% by weight of hydraulic cement in the composition.

The improved methods of the invention for cementing pipe in a well bore are comprised of the steps of preparing a cement composition of this invention which hardens into a resilient solid mass having high strength as described above, placing the cement composition in the annulus between a pipe and the walls of a well bore and allowing the cement composition to harden therein.

In order to further illustrate the compositions and methods of the present invention, the following examples are given.

EXAMPLE

A first cement composition was prepared by combining 424.4 grams of an aqueous styrene-butadiene latex which contained 50% by weight water and had a weight ratio of styrene to butadiene of about 25%:75% with 45.6 grams of an aqueous rubber latex stabilizing surfactant comprised of an ethoxylated alcohol sulfonate. 800 grams of Premium Class G cement were added to the mixture of latex and stabilizer, and the resulting cement composition was vigorously mixed for 35 seconds after which it was cured at 140° F. for 72 hours. A second cement composition was prepared which was identical to the first composition described above except that 8 grams of porous precipitated silica hydrophobicized with silicon oil were combined with the composition. The second cement composition was also mixed for 35 seconds and cured at 140° F. for 72 hours. A third composition identical to the first composition described above was prepared except that 4 grams of the hydrophobicized silica were added to the composition. The third composition was also mixed and cured at 140° F. for 72 hours.

A fourth cement composition was prepared by combining 353.7 grams of the aqueous styrene-butadiene latex described above with 38 grams of the latex stabilizer described above. To that mixture, 800 grams of Premium Class G cement, 78.1 grams of an epoxy resin comprised of the condensation product of epichlorohydrin and bisphenol A and 10.9 grams of an epoxy resin hardening agent comprised of diethyltoluenediamine were added. The fourth cement composition was vigorously mixed for 35 seconds and then cured at 140° F. for 72 hours. A fifth cement composition identical to the above described fourth composition was prepared except that 8 grams of hydrophobicized silica was added to the composition prior to when it was mixed and cured at 140° F. for 72 hours. A sixth composition identical to the fourth composition was prepared except that 4 grams of hydrophobicized silica were added to the composition prior to when it was mixed and cured at 140° F. for 72 hours. A seventh cement composition identical to the fourth cement composition described above was prepared except that a bisphenol A novolac epoxy resin was substituted for the condensation product of epichlorohydrin and bisphenol A and 9.1 grams of diethyltoluenediamine hardening agent were included in the composition. The seventh composition was also mixed and cured at 140° F. for 72 hours. An eighth cement composition was prepared which was identical to the seventh composition described above except that 8 grams of hydrophobicized silica were added to the composition prior to when it was mixed and cured at 140° F. for 72 hours. A ninth cement composition which was also identical to the seventh composition was prepared except that 4 grams of hydrophobicized silica were added to the composition prior to when it was mixed and cured at 140° F. for 72 hours.

Cured samples of the nine cement compositions described above were used to measure the mechanical properties of the compositions. That is, the confined and unconfined compressive strengths of samples were determined in accordance with the procedure set forth in the *API Specification For Materials And Testing for Well Cements,* API Specification 10, 5th Edition, dated Jul. 1, 1990 of the American Petroleum Institute.

In addition, samples of the nine compositions were cured in the annuluses of pipe assemblies, i.e., small pipes centered inside larger pipes. The samples were cured in the pipe assemblies at 140° F. for 72 hours. After curing, the shear bond strength of each composition was determined by supporting the larger pipe and applying force to the smaller inner pipe. The shear bond strength is the total force applied divided by the bonded surface area which breaks. Additional samples of the nine cured compositions were tested for Brazilian tensile strength.

The results of these tests are given in the Table below.

TABLE

Cement Composition Strength Tests

| Composition No. | Cement[1], Latex[2] and Latex Stabilizer[3] | Hydrophobicized Silica | Epoxy Resin and Hardening Agent[6] | Shear Bond Strength, psi | Compressive Strength, psi | | | Tensile Strength, psi |
|---|---|---|---|---|---|---|---|---|
| | | | | | Unconfined | 250 psi Confining Pressure | 500 psi Confining Pressure | |
| 1 | Yes | No | No | 107 | 587 | 1043 | 1420 | 100 |
| 2 | Yes | Yes | No | 187 | 653 | 1119 | 1358 | 104 |
| 3 | Yes | Yes | No | 145 | 645 | 1085 | 1335 | 112 |
| 4 | Yes | No | Yes[4] | 160 | 878 | 1333 | 1731 | 107 |
| 5 | Yes | Yes | Yes[4] | 125 | 1033 | 1511 | 1913 | 172 |
| 6 | Yes | Yes | Yes[4] | 143 | 940 | 1461 | 1788 | 152 |
| 7 | Yes | No | Yes[5] | 160 | 1045 | 1496 | 1804 | 116 |
| 8 | Yes | Yes | Yes[5] | 186 | 894 | 1365 | 1733 | 165 |
| 9 | Yes | Yes | Yes[5] | 186 | 886 | 1341 | 1678 | 137 |

[1]Premium cement
[2]Styrene-butadiene latex (Latex 2000 ™)
[3]Ethoxylated alcohol sulfonate
[4]Condensation product of epichlorohydrin and bisphenol A
[5]Epoxidized bisphenol A novolac resin
[6]Diethyltoluenediamine From the above Table, it can be seen that the test compositions containing hydrophobicized silica had improved compressive strengths, shear bond strengths and tensile strengths. Also, it can be seen that the compositions including both hydrophobicized silica and hardened epoxy resin had significantly higher compressive strengths, shear bond strengths and tensile strengths.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. An improved cement composition which hardens into a resilient solid mass having high strength comprising:

a hydraulic cement;

an aqueous rubber latex present in an amount in the range of from about 40% to about 55% by weight of hydraulic cement in said composition;

an effective amount of an aqueous rubber latex stabilizing surfactant; and silica hydrophobicized with silicon oil present in an amount in the range of from about 0.5% to about 2% by weight of hydraulic cement in said composition.

2. The composition of claim 1 wherein said aqueous rubber latex is selected from the group of cis-polyisoprene rubber, nitrile rubber, ethylene-propylene rubber, styrene-butadiene rubber, nitrile-butadiene rubber, butyl rubber and neoprene rubber.

3. The composition of claim 1 wherein said aqueous rubber latex is an aqueous styrene-butadiene latex.

4. The composition of claim 3 wherein said aqueous styrene-butadiene latex contains water in the amount of about 50% by weight of said latex and the weight ratio of styrene to butadiene in said latex is about 25%:75%.

5. The composition of claim 1 wherein said aqueous rubber latex stabilizing surfactant is an ethoxylated alcohol sulfonate present in an amount in the range of from about 10% to about 20% by weight of said aqueous rubber latex in said composition.

6. The composition of claim 1 wherein said hydraulic cement is Portland cement.

7. The composition of claim 1 which further comprises an epoxy resin and an epoxy resin hardening agent.

8. The composition of claim 7 wherein said epoxy resin is selected from the group of a condensation reaction product of epichlorohydrin and bisphenol A and an epoxidized bisphenol A novolac resin and is present in an amount in the range of from about 5% to about 15% by weight of hydraulic cement in said composition.

9. The composition of claim 7 wherein said hardening agent is at least one member selected from the group of aliphatic amines, aromatic amines and carboxylic acid anhydrides and is present in an amount in the range of from about 10% to about 30% by weight of epoxy resin in said composition.

10. An improved cement composition which hardens into a resilient solid mass having high strength comprising:

a hydraulic cement;

an aqueous styrene-butadiene latex which contains water in an amount of about 50% by weight of said latex and the weight ratio of styrene to butadiene in said latex is about 25%:75%, said latex being present in an amount in the range of from about 44% to about 53% by weight of hydraulic cement in said composition;

an aqueous rubber latex stabilizing surfactant comprised of an ethoxylated alcohol sulfonate present in an amount in the range of from about 10% to about 15% by weight of said aqueous rubber latex in said composition;

an epoxy resin comprised of the condensation product of epichlorohydrin and bisphenol A present in an amount in the range of from about 10% to about 12% by weight of hydraulic cement in said composition;

an epoxy resin hardening agent comprised of diethyltoluenediamine present in an amount in the range of from about 10% to about 20% by weight of epoxy resin in said composition; and porous precipitated silica hydrophobicized with silicon oil present in an amount in the range of from about 0.5% to about 1% by weight of hydraulic cement in said composition.

11. The composition of claim 10 wherein said hydraulic cement is Portland cement.

12. An improved cement composition which hardens into a resilient solid mass having high strength comprising:

a hydraulic cement;

an aqueous styrene-butadiene latex which contains water in an amount of about 50% by weight of said latex and the weight ratio of styrene to butadiene in said latex is about 25%:75%, said latex being present in an amount in the range of from about 40% to about 55% by weight of hydraulic cement in said composition;

an aqueous rubber latex stabilizing surfactant comprised of an ethoxylated alcohol sulfonate present in an amount in the range of from about 10% to about 20% by weight of said aqueous rubber latex in said composition; and silica hydrophobicized with silicon oil present in an amount in the range of from about 0.5% to about 2% by weight of hydraulic cement in said composition.

13. The composition of claim 12 wherein said hydraulic cement is Portland cement.

14. The composition of claim 12 further comprising an epoxy resin and an epoxy resin hardening agent.

15. The composition of claim 14 wherein said epoxy resin is selected from the group of a condensation reaction product of epichlorohydrin and bisphenol A and an epoxidized bisphenol A novolac resin and is present in an amount in the range of from about 5% to about 15% by weight of hydraulic cement in said composition.

16. The composition of claim 14 wherein said hardening agent is at least one member selected from the group of aliphatic amines, aromatic amines and carboxylic acid anhydrides and is present in an amount in the range of from about 10% to about 30% by weight of epoxy resin in said composition.

* * * * *